(12) United States Patent
Fujiwara

(10) Patent No.: US 11,339,584 B2
(45) Date of Patent: May 24, 2022

(54) OUTER HANDLE DEVICE FOR VEHICLE DOOR

(71) Applicant: KABUSHIKI KAISHA HONDA LOCK, Miyazaki (JP)

(72) Inventor: Hiroto Fujiwara, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 321 days.

(21) Appl. No.: 16/701,695

(22) Filed: Dec. 3, 2019

(65) Prior Publication Data

US 2020/0181940 A1 Jun. 11, 2020

(30) Foreign Application Priority Data

Dec. 6, 2018 (JP) .............................. JP2018-229265

(51) Int. Cl.
*E05B 5/02* (2006.01)
*E05B 7/00* (2006.01)
(Continued)

(52) U.S. Cl.
CPC ............ *E05B 5/003* (2013.01); *B60J 5/0468* (2013.01); *E05B 7/00* (2013.01); *E05B 85/107* (2013.01)

(58) Field of Classification Search
CPC . E05B 5/00; E05B 5/003; E05B 5/006; E05B 7/00; E05B 85/10; E05B 85/103;
(Continued)

(56) References Cited

U.S. PATENT DOCUMENTS 10,072,447 B2 9/2018 Fujiwara
10,167,656 B2 1/2019 Park et al.
(Continued)

FOREIGN PATENT DOCUMENTS

CN 106014024 A 10/2016
CN 106414874 A 2/2017
(Continued)

OTHER PUBLICATIONS

Official Communication dated Nov. 20, 2020 issued over the corresponding Chinese Patent Application No. 201911225021.2.
(Continued)

*Primary Examiner* — Christine M Mills
*Assistant Examiner* — Christopher F Callahan
(74) *Attorney, Agent, or Firm* — Carrier Blackman & Associates, P.C.; Joseph P. Carrier; Anne G. Sabourin

(57) ABSTRACT

In an outer handle device for a vehicle door, a handle lever is operatively linked to an outer handle, the handle lever being driven by an electric actuator so that the outer handle is pivoted from a housed position to a pop-up position. A restriction device operates so as to follow movement of the handle lever toward a side that goes away from an initial position when the handle lever is driven by the electric actuator so that the outer handle is pivoted from the housed position toward the pop-up position side, the restriction device restricting return of the handle lever to the initial position side from a maximum operated position of the handle lever toward the side that goes away from the initial position. Accordingly, it is possible to prevent the outer handle from rattling, thereby enabling marketability to be enhanced.

1 Claim, 10 Drawing Sheets

(51) Int. Cl.
*B60J 5/04* (2006.01)
*E05B 85/10* (2014.01)

(58) Field of Classification Search
CPC ........ E05B 85/107; E05B 85/14; E05B 85/16;
Y10T 292/57
See application file for complete search history.

(56) References Cited

U.S. PATENT DOCUMENTS

| | | | |
|---|---|---|---|
| 2015/0233154 A1* | 8/2015 | Smart | E05B 81/90 |
| | | | 70/237 |
| 2017/0089102 A1 | 3/2017 | Yoshino | |
| 2017/0107744 A1 | 4/2017 | Wilke et al. | |
| 2018/0171686 A1* | 6/2018 | Couto Maquieira | E05B 81/90 |

FOREIGN PATENT DOCUMENTS

| | | | | |
|---|---|---|---|---|
| EP | 1 607 556 A1 | 12/2005 | | |
| EP | 2730730 A2 * | 5/2014 | ............ | E05B 5/006 |
| EP | 3 067 494 A1 | 9/2016 | | |
| JP | H05-34266 U | 5/1993 | | |
| JP | 2000-080836 A | 3/2000 | | |
| JP | 2015-090028 A | 5/2015 | | |
| JP | 2017-066605 A | 4/2017 | | |

OTHER PUBLICATIONS

Official Communication dated Jul. 28, 2021 issued over the corresponding Japanese Patent Application No. 2018-229265.

* cited by examiner

OUTER HANDLE DEVICE FOR VEHICLE DOOR

CROSS REFERENCE TO RELATED APPLICATIONS

The present application claims priority under 35 U.S.C. § 119 to Japanese Patent Application No. 2018-229265 filed Dec. 6, 2018 the entire contents of which are hereby incorporated by reference.

BACKGROUND OF THE INVENTION

Field of the Invention

The present invention relates to an outer handle device for a vehicle door, comprising a support case that is mounted on an outer panel of a door, an outer handle that has an operating portion capable of being manually operated and is supported on the support case while being capable of being pivoted between a housed position in which the operating portion is housed on the support case side and a full stroke position due to a manual operation, a pop-up position being set between the housed position and the full stroke position, a handle lever that is operatively linked to the outer handle, is supported on the support case so as to be capable of operating, and is resiliently urged toward an initial position side when the outer handle is in the housed position, and an electric actuator that is mounted on the support case so as to be capable of switching between an energized and operated state in which the handle lever is driven from the initial position so that the outer handle is pivoted from the housed position to the pop-up position and a non-operated state due to suspension of energization when the outer handle attains the pop-up position.

DESCRIPTION OF THE RELATED ART

An outer handle device for a vehicle door is known from Japanese Patent Application Laid-open No. 2017-66605 in which, due to a lock release lever (corresponding to the handle lever of the invention of the present application) operatively linked to an outer handle being driven by an electric actuator, the outer handle is pivoted from a housed position to a pop-up position, and return of the lock release lever at the pop-up position to the initial position side is restricted by a pin fixed to a rotating member of the electric actuator abutting against the lock release lever.

In the arrangement disclosed in Japanese Patent Application Laid-open No. 2017-66605 above, when the electric actuator is energized and operated so as to pivot the outer handle from the housed position to the pop-up position, there is a possibility that the lock release lever will be operated beyond the proper position by inertial force, and in the arrangement disclosed in Japanese Patent Application Laid-open No. 2017-66605 above, the lock release lever urged toward the initial position side rattles due to the inertial force and a reaction force that occurs when it is abutted against the pin by the urging force, the outer handle also rattles in response thereto, and there is a possibility that the marketability will thus be degraded.

SUMMARY OF THE INVENTION

The present invention has been accomplished in light of such circumstances, and it is an object thereof to provide an outer handle device for a vehicle door having enhanced marketability in which, when a handle lever is driven by an electric actuator so that an outer handle is pivoted from a housed position to a pop-up position, rattling of the handle lever, and consequently the outer handle, will not occur.

In order to achieve the object, according to a first aspect of the present invention, there is provided an outer handle device for a vehicle door, comprising a support case that is mounted on an outer panel of a door, an outer handle that has an operating portion capable of being manually operated and is supported on the support case while being capable of being pivoted between a housed position in which the operating portion is housed on the support case side and a full stroke position due to a manual operation, a pop-up position being set between the housed position and the full stroke position, a handle lever that is operatively linked to the outer handle, is supported on the support case so as to be capable of operating, and is resiliently urged toward an initial position side when the outer handle is in the housed position, and an electric actuator that is mounted on the support case so as to be capable of switching between an energized and operated state in which the handle lever is driven from the initial position so that the outer handle is pivoted from the housed position to the pop-up position and a non-operated state due to suspension of energization when the outer handle attains the pop-up position, wherein the outer handle device further comprises a restriction device that operates so as to follow movement of the handle lever toward a side that goes away from the initial position when the handle lever is driven by the electric actuator so that the outer handle is pivoted from the housed position toward the pop-up position side, the restriction device restricting return of the handle lever to the initial position side from a maximum operated position of the handle lever toward the side that goes away from the initial position.

In accordance with the present invention, when the handle lever is driven so that the outer handle is pivoted from the housed position toward the pop-up position side, the restriction device operates so as to follow movement of the handle lever toward the side that goes away from the initial position, the restriction device restricting return of the handle lever to the initial position side. Therefore, even if the handle lever operates beyond the proper position due to inertial force, since the restriction device follows movement of the handle lever so as to regulate the position of the handle lever beyond the proper position and restrict return of the handle lever to the initial position side, thereby preventing the handle lever, and consequently the outer handle, from rattling, so as to enable the marketability to be enhanced.

According to a second aspect of the present invention, in addition to the first aspect, the handle lever is pivotably supported on the support case, the restriction device comprises a restricting member having an inclined abutment face that abuts against the handle lever from the initial position side in response to the handle lever passing through when the outer handle is operated from the housed position toward the pop-up position side, and a resilient urging member that urges the restricting member toward a side on which the inclined abutment face is made to abut against the handle lever, and the inclined abutment face is formed in an inclined manner so as to abut against the handle lever at a position that goes away from the initial position as an amount by which the restricting member urged by the resilient urging member is operated so as to follow the handle lever increases.

In accordance with the second aspect, the restriction device includes: the restricting member having the inclined abutment face; and the resilient urging member that urges the restricting member toward the side on which the inclined abutment face is made to abut against the handle lever. The inclined abutment face is inclined so as to abut against the handle lever at a position that goes away from the initial position as the amount by which the restricting member urged by the resilient urging member is operated so as to follow the handle lever increases. Therefore, even if the handle lever is operated beyond the proper position by inertial force, it is possible to resiliently restrict the position of the handle lever beyond the proper position while the restriction device follows the movement of the handle lever so as to reliably make the inclined abutment face abut against the handle lever.

According to a third aspect of the present invention, in addition to the first or second aspect, the electric actuator and the restriction device are formed so as to release restriction by the restriction device accompanying a return operation due to energization of the electric actuator in response to a predetermined state being established after the outer handle attains the full stroke position.

The above and other objects, characteristics and advantages of the present invention will be clear from detailed descriptions of the preferred embodiment which will be provided below while referring to the attached drawings.

DESCRIPTION OF THE PREFERRED EMBODIMENT

Figure 1:
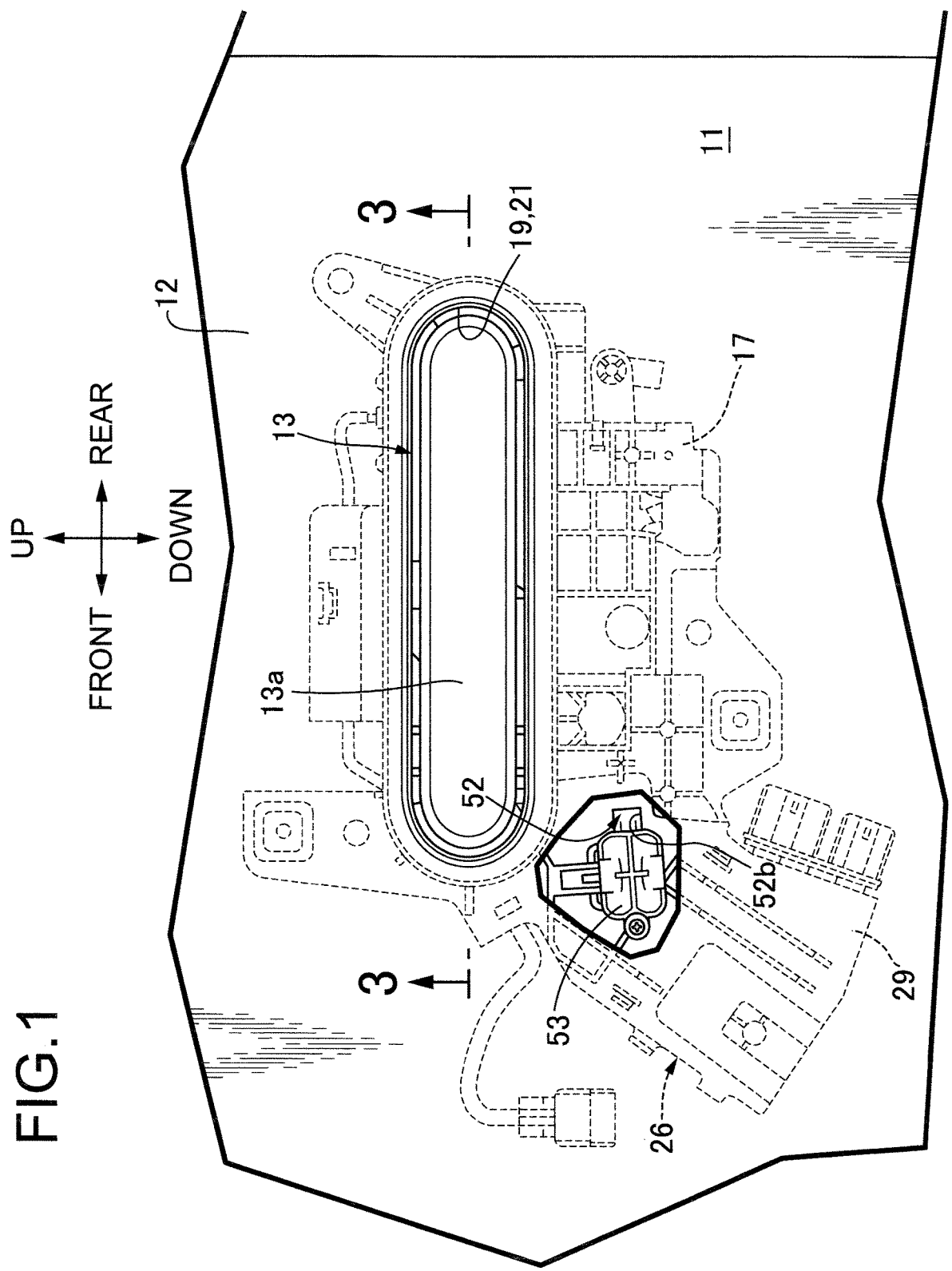
FIG. 1 is a side view showing an essential part of a door.
Figure 2A:
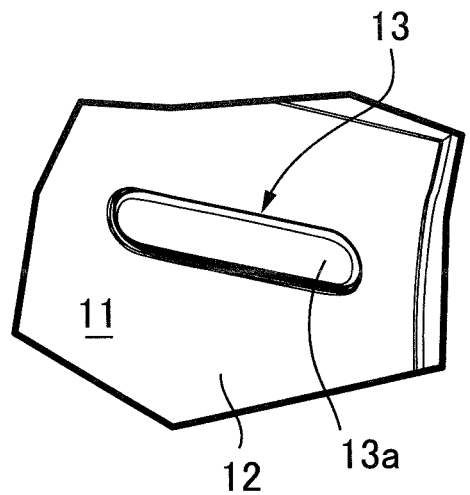
FIGS. 2A to 2C are side views showing an essential part of the door in a state in which an outer handle is in a housed position (FIG. 2A), a pop-up position (FIG. 2B), and a full stroke position (FIG. 2C).
Figure 2B:
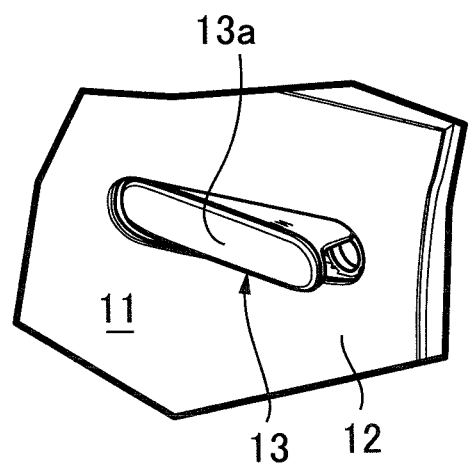
Figure 2C:
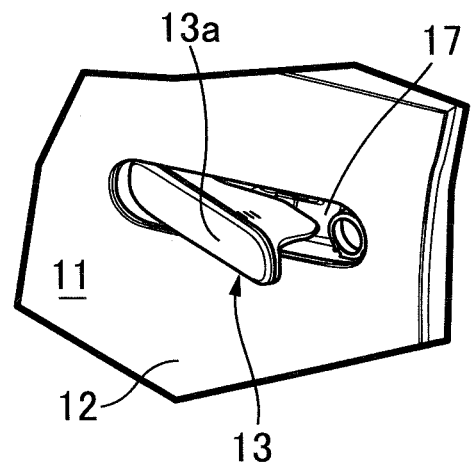

An embodiment of the present invention is explained below by reference to the attached FIG. 1 to FIG. 10. First, in FIG. 1 to FIG. 2C, disposed on an outer panel 12 in a side door 11 of a passenger vehicle is an outer handle 13 extending lengthwise in the vehicle fore-and-aft direction and having an operating portion 13a that can be manually operated, the outer handle 13 being capable of pivoting from a housed position in which as shown in FIG. 2A an outer face of the operating portion 13a is flush with an outer face of the outer panel 12, to a pop-up position in which as shown in FIG. 2B the operating portion 13a is made to project outward from the outer face of the outer panel 12, and then to a full stroke position in which as shown in FIG. 2C the operating portion 13a is pivoted further outward than in the pop-up position by gripping and operating the operating portion 13a.

Figure 3:
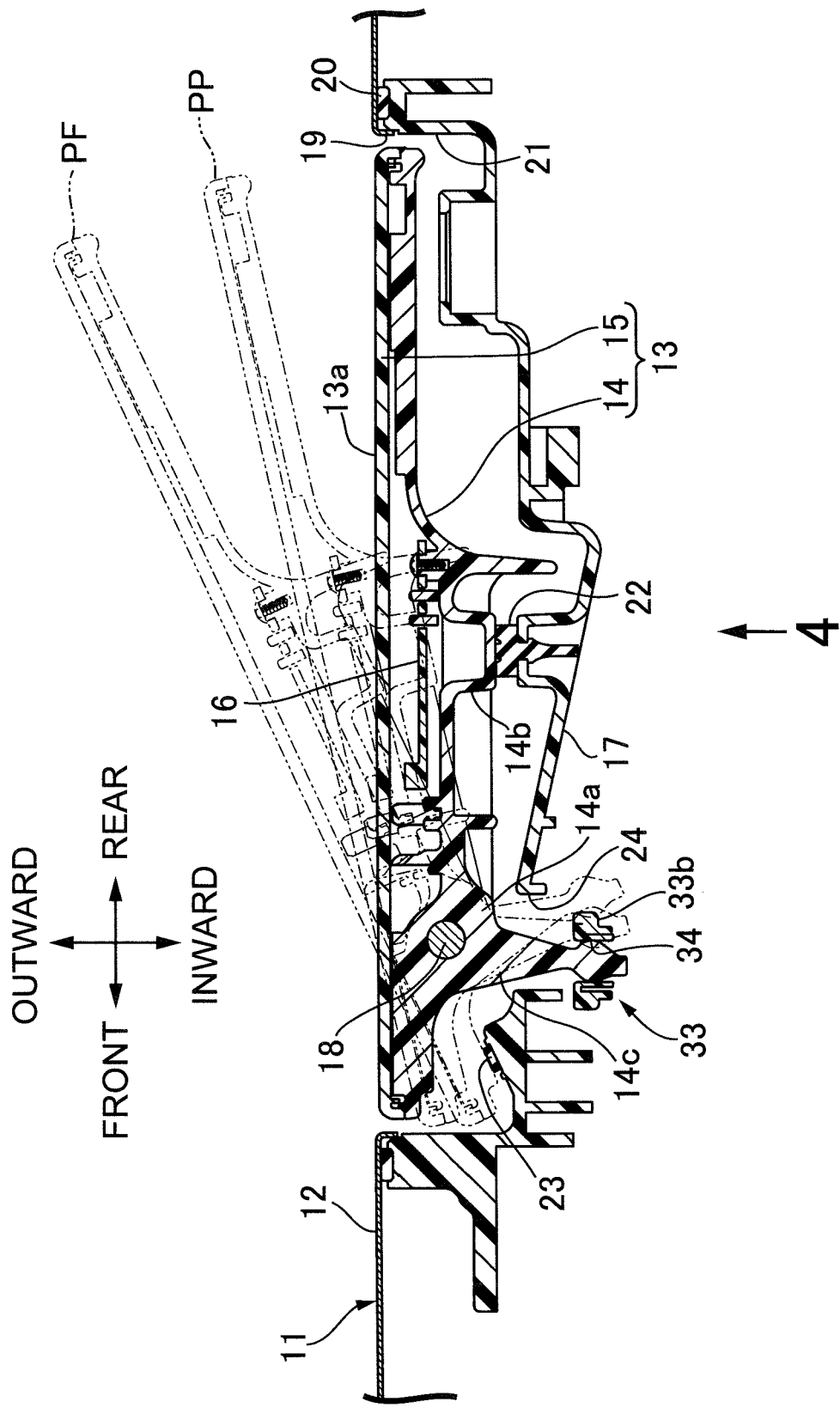
FIG. 3 is a sectional view along line 3-3 in FIG. 1.

Referring in addition to FIG. 3, the outer handle 13 is formed from a handle main body 14 extending lengthwise in the vehicle fore-and-aft direction and a cover member 15 fastened to the handle main body 14 so as to cover the handle main body 14 from the outer side, and a board 16 having mounted thereon an electronic component such as a touch sensor or an antenna is mounted on the handle main body 14, the board 16 being covered by the cover member 15. The operating portion 13a is formed from the handle main body 14 and the cover member 15 so as to extend lengthwise in the vehicle fore-and-aft direction.

A front end part along the vehicle fore-and-aft direction of the handle main body 14 in the outer handle 13 is pivotably supported on a support case 17 fixed to the outer panel 12 via a vertically extending first support shaft 18. Due to it being pivotably supported by the first support shaft 18, the outer handle 13 can pivot between the housed position (a position shown by the solid line) and a pop-up position PP (a position shown by a chain line) in which the operating portion 13a is made to project outward from the outer face of the outer panel 12, and also can pivot between the pop-up position PP and a full stroke position PF (a position shown by a chain line) in which it is pivoted further outward than the pop-up position PP.

An opening 19 extending lengthwise in the vehicle fore-and-aft direction is provided in the outer panel 12, the support case 17 is fastened to an inner face side of the outer panel 12 so as to close the opening 19 from the inner side of the outer panel 12, and a seal member 20 sealing the peripheral edge portion of the opening 19 is disposed between the support case 17 and the outer panel 12.

A housing recess part 21 extending lengthwise in the vehicle fore-and-aft direction so as to correspond to the opening 19 is formed in the support case 17 so as to be recessed toward the inner side of the outer panel 12, and the operating portion 13a of the outer handle 13 is housed in the housing recess part 21 in the housed position, in which the operating portion 13a is flush with the outer face of the outer panel 12. The first support shaft 18 is mounted on the support case 17 so as to transect the housing recess part 21 in the up-down direction, and the first support shaft 18 is inserted through a support portion 14a provided integrally with the handle main body 14 in the vicinity of the front end part of the operating portion 13a, the support portion 14a being disposed within the housing recess part 21.

A first elastic member 22 is mounted on the support case 17 so as to be positioned within the housing recess part 21, an abutment projecting portion 14b provided integrally with the handle main body 14 of the outer handle 13 abutting against the first elastic member 22 in the housed position, and a second elastic member 23 is adhered to the support case 17 so as to be positioned within the housing recess part 21, the front end part of the handle main body 14 in the outer handle 13 abutting against the second elastic member 23 in the full stroke position.

A linking projecting portion 14c connected to the support portion 14a is provided integrally with the handle main body 14 of the outer handle 13, the linking projecting portion 14c extending through an elongated hole 24 provided in the support case 17 and extending lengthwise in the vehicle fore-and-aft direction, and the tip end part of the linking projecting portion 14c projecting inward from the support case 17.

Figure 4:
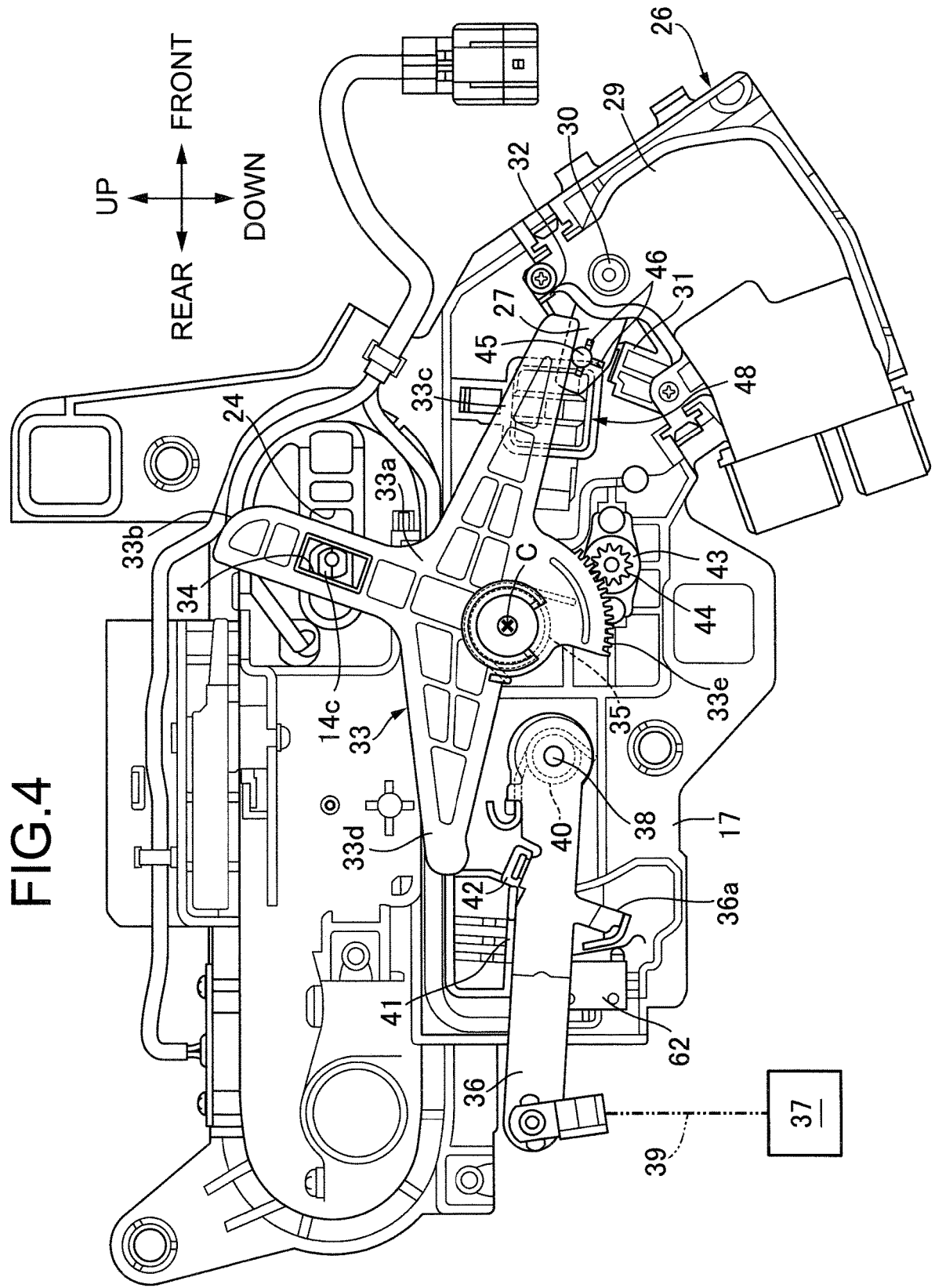
FIG. 4 is a view from the direction of arrow 4 in FIG. 3.

Referring in addition to FIG. 4, an electric actuator 26 is mounted on a front part of a back face of the support case 17 on the side opposite to the operating portion 13a of the outer handle 13, the electric actuator 26 being capable of pivoting the outer handle 13 in the housed position, in which it is housed on the support case 17 side, up to the pop-up position, in which the operating portion 13a projects outward from the outer panel 12.

The electric actuator 26 includes a drive lever 27 and an electric motor (not illustrated) that is housed in an actuator case 29 so as to exert power for pivoting the drive lever 27. The drive lever 27 pivots between an initial non-operated position shown in FIG. 4 and an operated position shown in FIG. 8, which is described later, and when energized the electric motor can pivot the drive lever 27 from the initial non-operated position to the operated position and, by reverse rotation, can also pivot the drive lever 27 so as to return it from the operated position to the initial non-operated position.

The actuator case 29 is mounted on a lower part of the front side of the back face of the support case 17 so as to protrude downward from the support case 17. One end part of the drive lever 27 is fixed to a pivot shaft 30 pivotably supported on an upper part of the actuator case 29, and a transmission mechanism (not illustrated) provided between the electric motor and the pivot shaft 30 is housed in the actuator case 29.

Provided on the support case 17 are a first stopper 31 and a second stopper 32 so as to prevent the drive lever 27 from pivoting further than necessary, the first stopper 31 being close to and opposing the drive lever 27 when the drive lever 27 is in the initial non-operated position, and the second stopper 32 being close to and opposing the drive lever 27 when the drive lever 27 is in the operated position.

On the other hand, a handle lever 33 operatively linked to the outer handle 13 is operably and, in this embodiment pivotably, supported on the back face of the support case 17 on the side opposite to the operating portion 13a of the outer handle 13.

The handle lever 33 integrally has a lever base portion 33a supported on the support case 17 to the rear of the electric actuator 26 so that it can pivot around a horizontal pivot axis C, a first link arm portion 33b extending upward from the lever base portion 33a, a second link arm portion 33c extending forward from the lever base portion 33a toward the drive lever 27 side, a third link arm portion 33d extending from the lever base portion 33a toward a side opposite to the second link arm portion 33c, and a sector gear portion 33e extending downward from the lever base portion 33a.

A link hole 34 extending lengthwise in the longitudinal direction is formed in the first link arm portion 33b, and the tip end part of the linking projecting portion 14c of the outer handle 13 is inserted into and linked to the link hole 34. That is, the handle lever 33 is operatively linked to the outer handle 13. Moreover, a first resilient urging member 35, which is a torsion spring, is provided between the support case 17 and the lever base portion 33a of the handle lever 33, the handle lever 33 being urged toward the initial position (position shown in FIG. 4) side corresponding to a state in which the outer handle 13 is in the housed position by the resilient urging force of the first resilient urging member 35.

A latch switching lever 36 is pivotably supported on the support case 17, the latch switching lever 36 pivoting in response to pivoting of the handle lever 33 accompanying manual operation of the outer handle 13 from the pop-up position to the full stroke position.

A latch mechanism 37 is provided on the side door 11 so as to be disposed beneath the latch switching lever 36, the latch mechanism 37 being capable of switching between a latched state in which a closed state of the side door 11 is retained by engagement with the vehicle body side and an unlatched state in which the side door 11 can be opened. The latch mechanism 37 includes an electric motor (not illustrated) that switches between an unlocked state in which the latched state can be released and a locked state in which the latched state cannot be released, and in response to the touch sensor within the outer handle 13 detecting that a legitimate vehicle user has gripped the outer handle 13 in the locked state the latch mechanism 37 attains the unlocked state.

The latch switching lever 36 extends in a direction that goes away from the lever base portion 33a of the handle lever 33 while being pivotably supported on the support case 17, via a second support shaft 38 having an axis parallel to the pivot axis C of the handle lever 33, beneath the third link arm portion 33d of the handle lever 33, and pivoting of the latch switching lever 36 is transmitted to the latch mechanism 37 via a transmission rod 39 having one end part linked to the tip end part of the latch switching lever 36.

The latch switching lever 36 is urged in a direction that pulls up the transmission rod 39 (the clockwise direction in FIG. 4) by the urging force of a second resilient urging member 40, which is a torsion spring, disposed around the second support shaft 38 and having opposite end parts engaged with the support case 17 and the latch switching lever 36, and a third stopper 41 is provided on the support case 17 so that it can abut against an upper side face of the latch switching lever 36, the third stopper 41 restricting the limit of pivoting of the latch switching lever 36 in the direction in which it is urged by the second resilient urging member 40.

A pressure-receiving part 42 disposed between the third stopper 41 and the second support shaft 38 in the vehicle fore-and-aft direction is provided on an upper part of the latch switching lever 36. When the outer handle 13 attains the pop-up position, the tip end part of the third link arm portion 33d of the handle lever 33 is close to and opposes, from above, the pressure-receiving part 42; when the outer handle 13 pivots from the pop-up position to the full stroke position, the tip end part of the third link arm portion 33d pushes down the pressure-receiving part 42, the latch switching lever 36 pivots so as to push down the transmission rod 39, and the latch mechanism 37 thereby changes from the latched state to the unlatched state.

An arm portion 36a extending downward is provided integrally with an intermediate lower part in the vehicle fore-and-aft direction of the latch switching lever 36, the arm portion 36a changing the switching mode of a limit switch 62 mounted on the support case 17 accompanying pivoting of the latch switching lever 36 by the third link arm portion 33d.

The sector gear portion 33e of the handle lever 33 meshes with a gear 44 of a rotary damper 43 fastened to the support case 17. Whereas the outer handle 13 and the handle lever 33 are urged by the first resilient urging member 35 toward the housed position of the outer handle 13, that is, the initial position side of the handle lever 33, the rotary damper 43 functions so as to pivot the outer handle 13 gently to the pop-up position and the housed position even if a hand is detached from the outer handle 13 after pivoting the outer handle 13 to the full stroke position.

An abutment pin 45 is implanted in the tip end part of the drive lever 27 of the electric actuator 26. The abutment pin 45 abuts against the second link arm portion 33c of the handle lever 33 from below in a state in which the handle lever 33 is in the initial position and the drive lever 27 is in the initial non-operated position, and a reinforcing rib 46 for ensuring the strength with which the abutment pin 45 is fixed to the drive lever 27 is provided at a plurality of locations in the peripheral direction of the abutment pin 45.

Putting the electric actuator 26 into an energized and operated state when the outer handle 13 is in the housed position pivots the drive lever 27 from the initial non-operated position toward the operated position; due to the second link arm portion 33c being pushed up by the abutment pin 45 the handle lever 33 pivots in the counterclockwise direction in FIG. 4, and the outer handle 13 is pivoted from the housed position toward the pop-up position side. When the outer handle 13 attains the pop-up position, energization of the electric actuator 26 is suspended, and due to this suspension of energization the electric actuator 26 attains a non-operated state.

The support case 17 is provided with a restriction device 48 that restricts the return of the handle lever 33 from its maximum operated position to the initial position side when the handle lever 33 is driven from the initial position by the electric actuator 26 so as to pivot the outer handle 13 from the housed position toward the pop-up position side.

Figure 5:
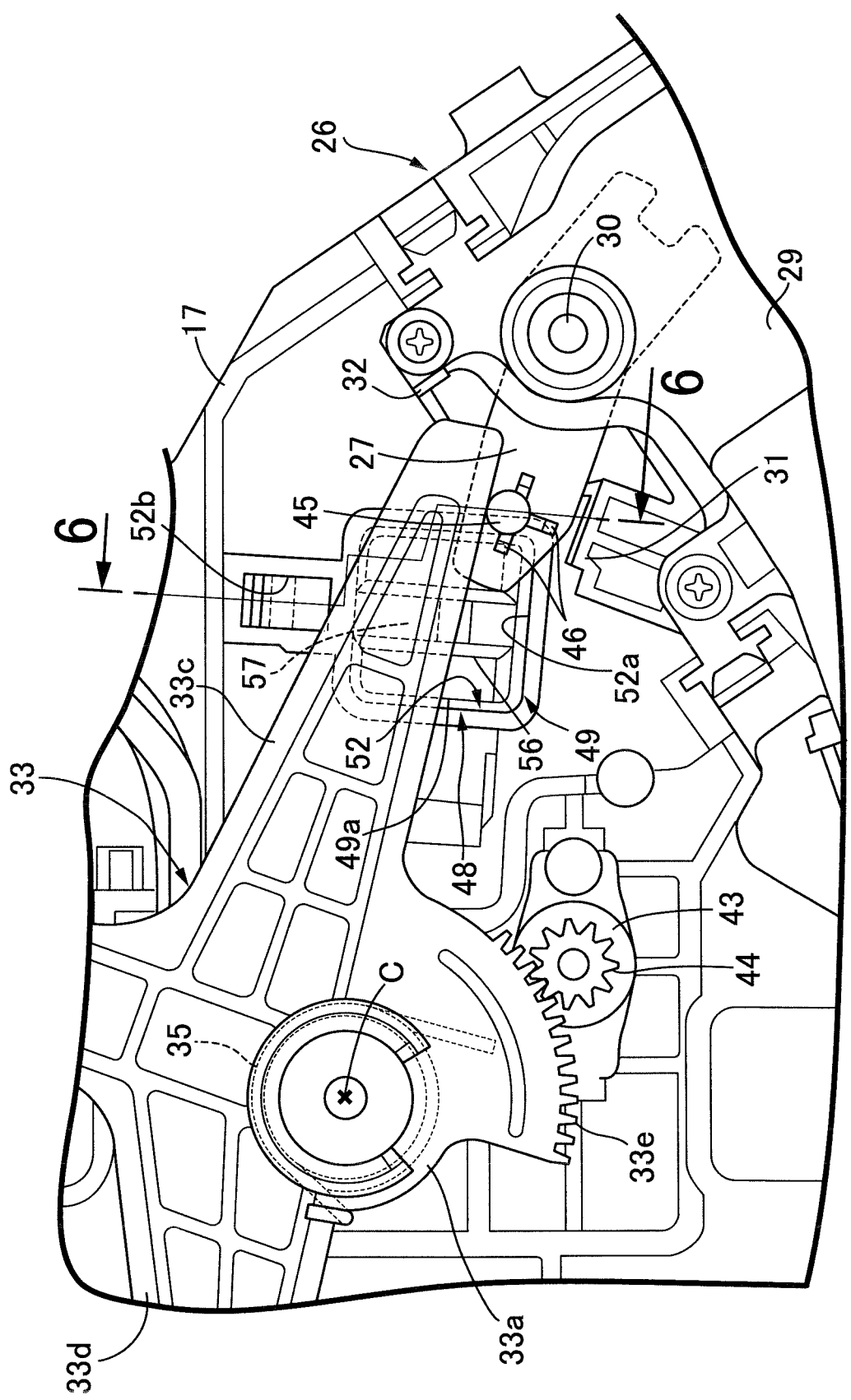
FIG. 5 is a side view showing an essential part of FIG. 4 in a state in which the outer handle is in the housed position.
Figure 6:
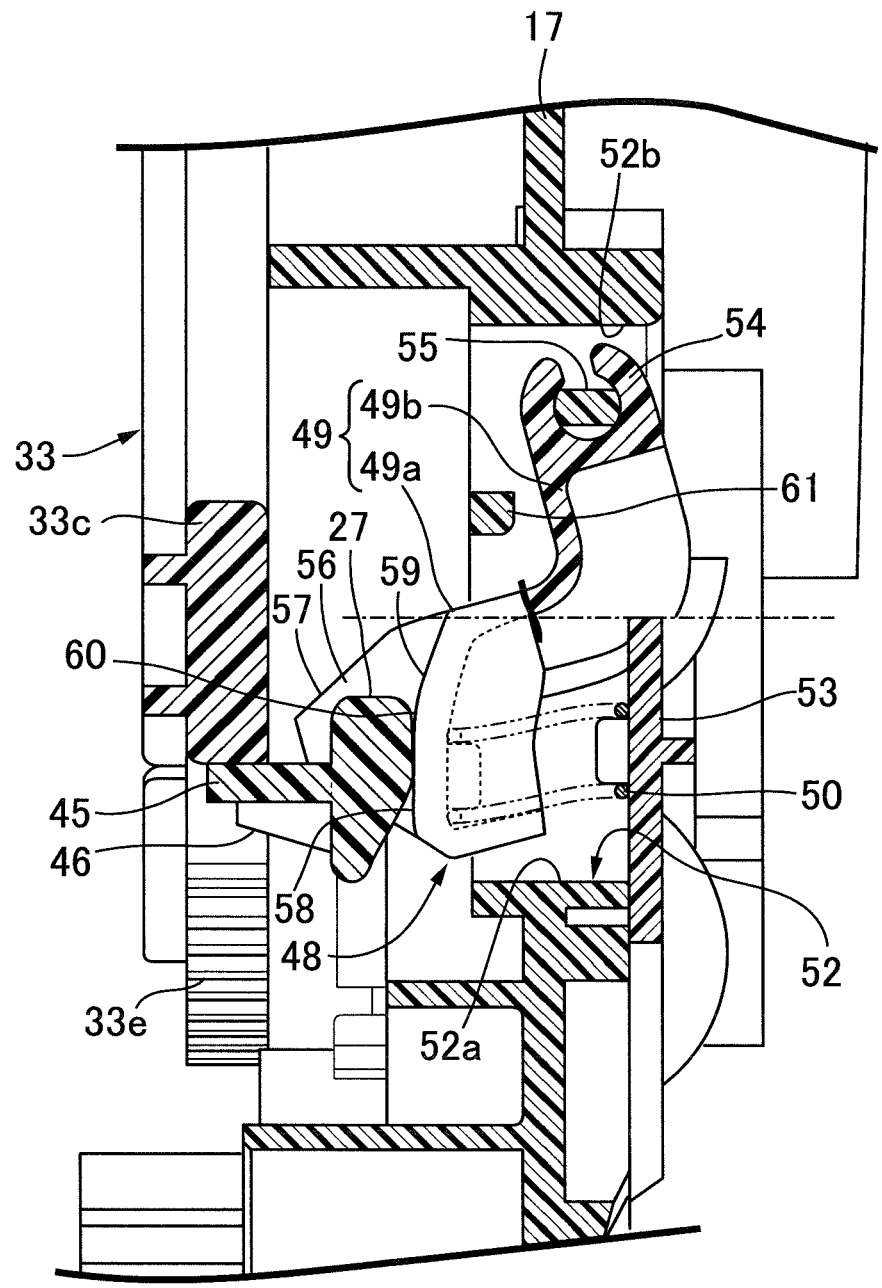
FIG. 6 is a sectional view along line 6-6 in FIG. 5.

Referring in addition to FIG. 5 and FIG. 6, the restriction device 48 includes a restricting member 49 having an inclined abutment face 57 that abuts against the handle lever 33 from the initial position side in response to the handle lever 33 passing through when the outer handle 13 is operated from the housed position toward the pop-up position side, and a third resilient urging member 50 that exerts a resilient force urging the restricting member 49 in one direction along the horizontal pivot axis C of the handle lever 33. The third resilient urging member 50 is a coil spring in this embodiment.

In order to dispose the restriction device 48, the support case 17 is provided with a housing hole 52 extending in parallel with the pivot axis C of the handle lever 33, part of one end side of the housing hole 52 being covered by the second link arm portion 33c of the handle lever 33. The housing hole 52 is formed so as to have a rectangular housing hole main portion 52a and a rectangular extending hole portion 52b that is connected to a middle part of the housing hole main portion 52a in the vehicle fore-and-aft direction and extends upward, and a lid member 53 closing an open end of the housing hole main portion 52a on the front face side of the support case 17, that is, the outer panel 12 side is mounted on the support case 17.

Figure 7:
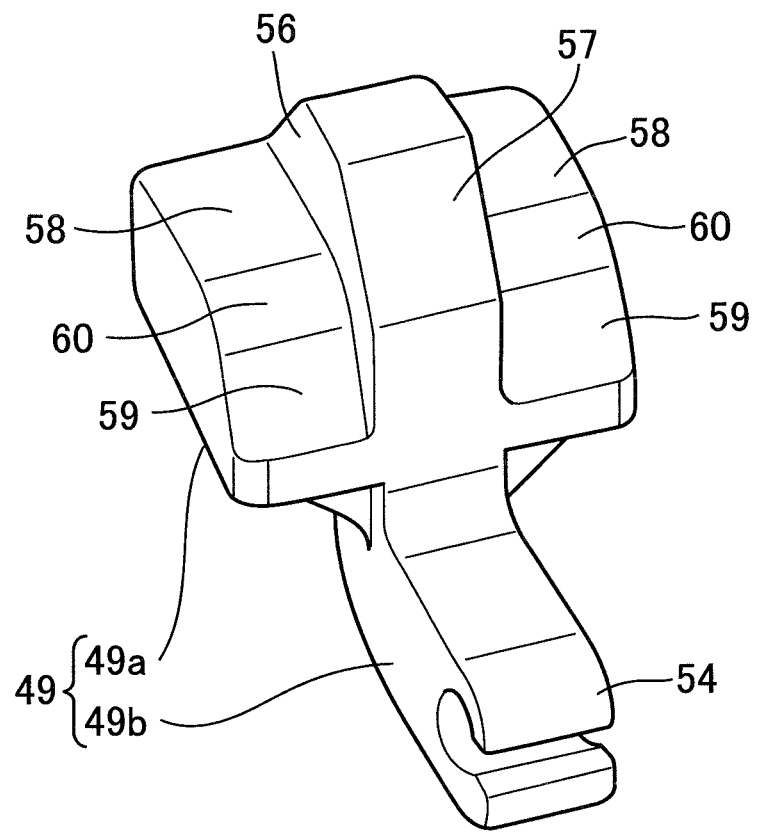
FIG. 7 is a perspective view of a restricting member.

In FIG. 7, the restricting member 49 is formed by connectedly providing a base end part of a support arm portion 49b integrally with a restricting member main portion 49a housed in the housing hole main portion 52a of the housing hole 52, the support arm portion 49b having a substantially L-shape so as to be housed in the extending hole portion 52b of the housing hole 52, and a substantially C-shaped supported part 54 is formed at the tip end part of the support arm portion 49b. On the other hand, a third support shaft 55 is provided on the support case 17, the third support shaft 55 transecting the extending hole portion 52b of the housing hole 52 in the vehicle fore-and-aft direction, and fitting the third support shaft 55 onto the supported part 54 pivotably supports the support arm portion 49b, that is, the restricting member 49, on the support case 17, the third resilient urging member 50 being provided between the lid member 53 and the restricting member main portion 49a.

The restricting member main portion 49a is disposed beneath the third support shaft 55 and operates within the housing hole main portion 52a, and a bulge part 56 is formed on a middle part of the restricting member main portion 49a in the vehicle fore-and-aft direction on the side facing the second link arm portion 33c. The tip end portion of the bulge part 56 is formed as the inclined abutment face 57, which can abut against the second link arm portion 33c of the handle lever 33 from the initial position side when the handle lever 33 pivots from the initial position so as to pivot the outer handle 13 from the housed position toward the pop-up position side.

The third resilient member 50 resiliently urges the restricting member 49 toward the side on which the inclined abutment face 57 is made to abut against the second link arm portion 33c from the initial position side in response to the second link arm portion 33c of the handle lever 33 passing through when the outer handle 13 is operated from the housed position toward the pop-up position side, and the inclined abutment face 57 is formed in an inclined manner so as to abut against the second link arm portion 33c of the handle lever 33 at a position that goes away from the initial position as the amount by which the restricting member 49 urged by the third resilient urging member 50 is operated so as to follow the handle lever 33 increases.

Formed on the restricting member main portion 49a on each of opposite sides of the bulge part 56 are a first inclined face 58 having the same direction of inclination as that of the inclined abutment face 57, a second inclined face 59 that has a larger angle of inclination than that of the first inclined face 58 and is disposed on the side that is farther from the initial position than the first inclined face 58, and a curved face 60 joining the first and second inclined faces 58, 59.

Figure 8:
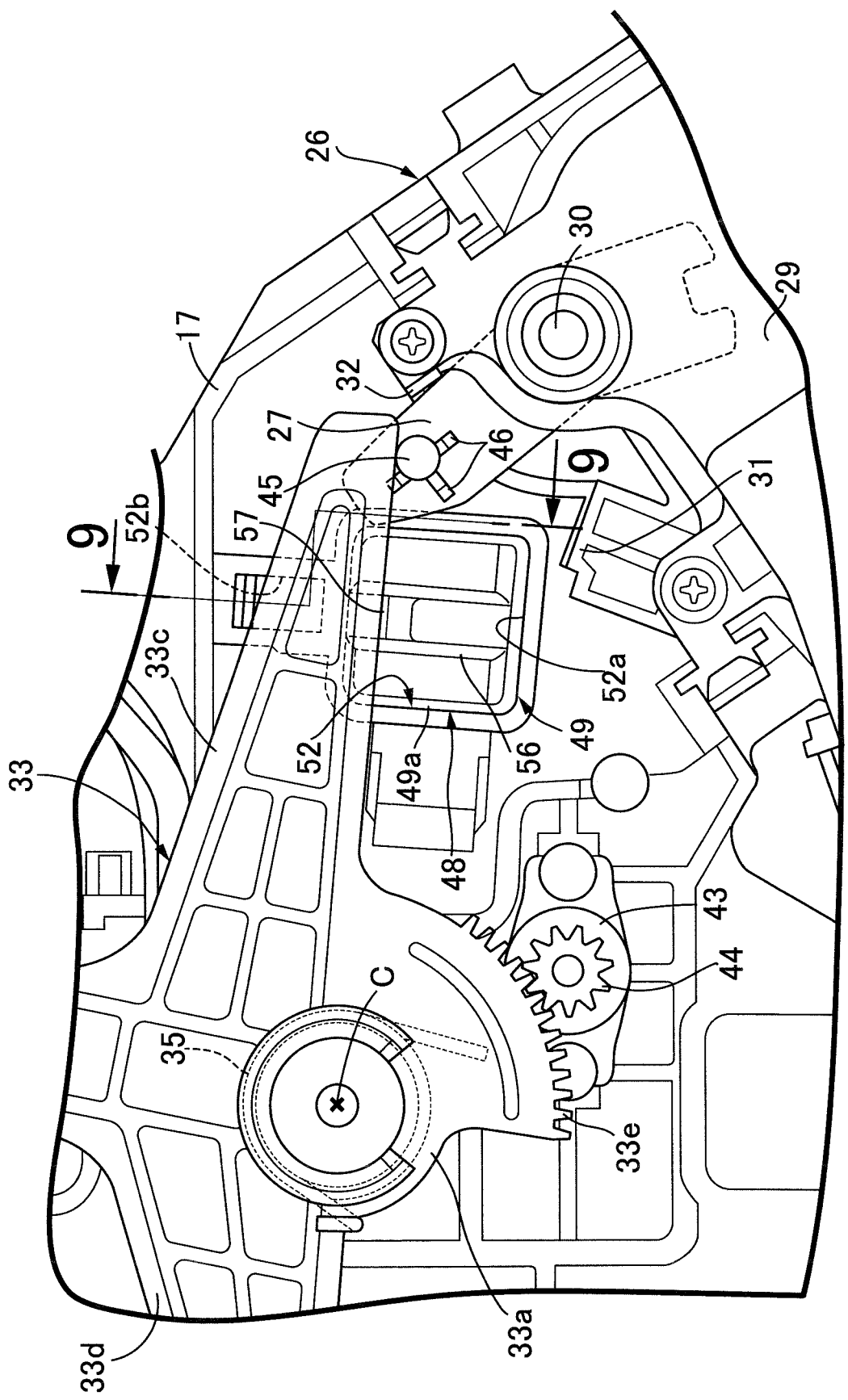
FIG. 8 is a side view, corresponding to FIG. 5, in a state in which the outer handle is in the pop-up position.
Figure 9:
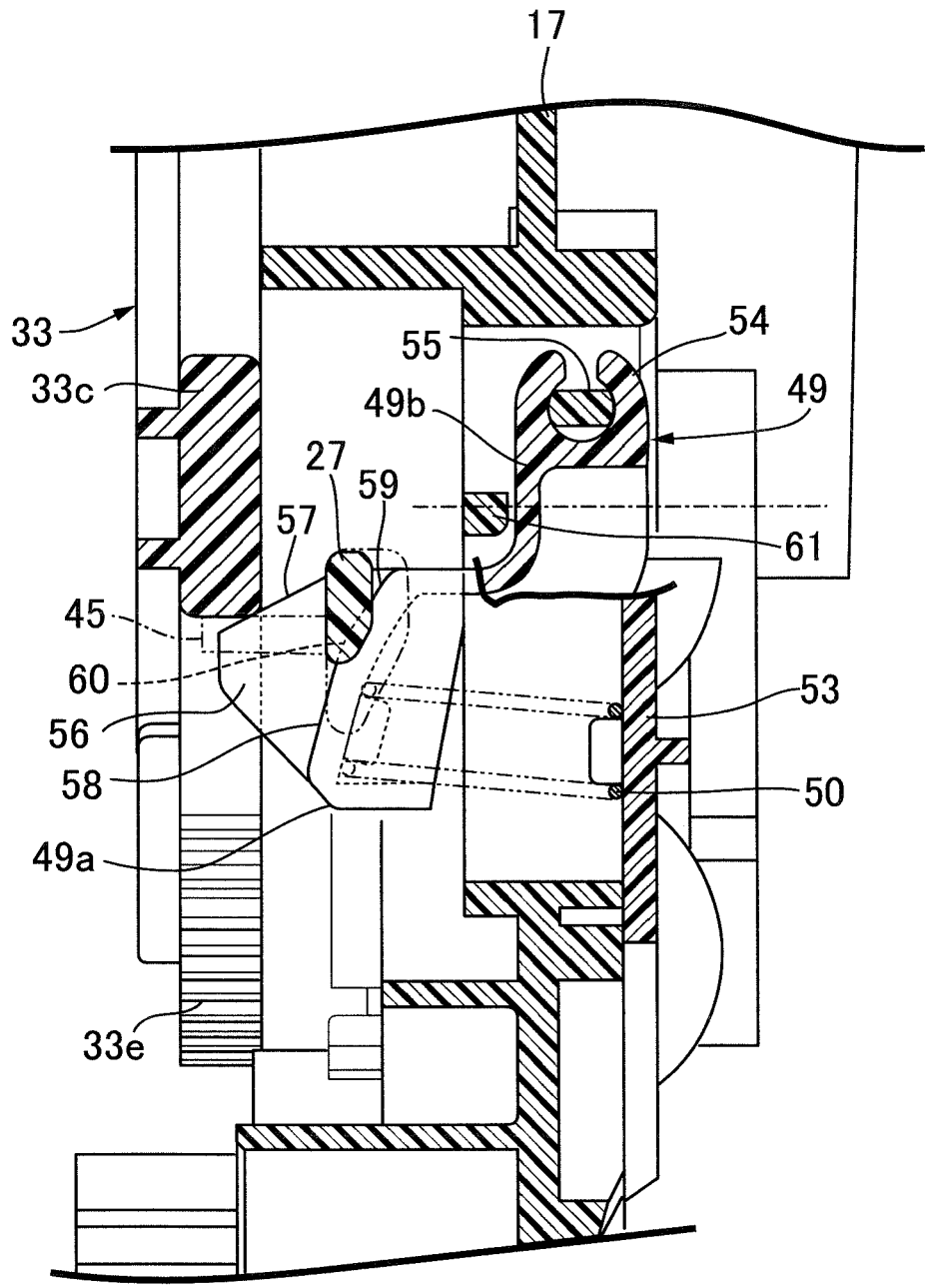
FIG. 9 is a sectional view along line 9-9 in FIG. 8.

In a state in which the handle lever 33 is in the initial position, such a restricting member 49 is in a state in which as shown in FIG. 5 and FIG. 6 the drive lever 27 abuts against the first inclined face 58 on one side among the first inclined faces 58, the second inclined faces 59, and the curved faces 60 on opposite sides of the bulge part 56 of the restricting member main portion 49a, and the inclined abutment face 57 of the restricting member main portion 49a does not abut against the second link arm portion 33c of the handle lever 33. However, as shown in FIG. 8 and FIG. 9, when the handle lever 33 pivots until the outer handle 13 attains the pop-up position, pivoting of the drive lever 27 toward the operated position side allows the restricting member main portion 49a to move in a direction in which it projects from the housing hole main portion 52a, and as shown in FIG. 9 the inclined abutment face 57 abuts against the second link arm portion 33c of the handle lever 33 from the initial position side of the handle lever 33 in response to the second link arm portion 33c of the handle lever 33 passing through.

In this arrangement, even if the handle lever 33 operates beyond the proper position corresponding to the pop-up position due to inertial force, since the restricting member 49 resiliently urged by the third resilient urging member 50 follows movement of the handle lever 33, a state in which the inclined abutment face 57 abuts against the second link arm portion 33c of the handle lever 33 is maintained.

Figure 10:
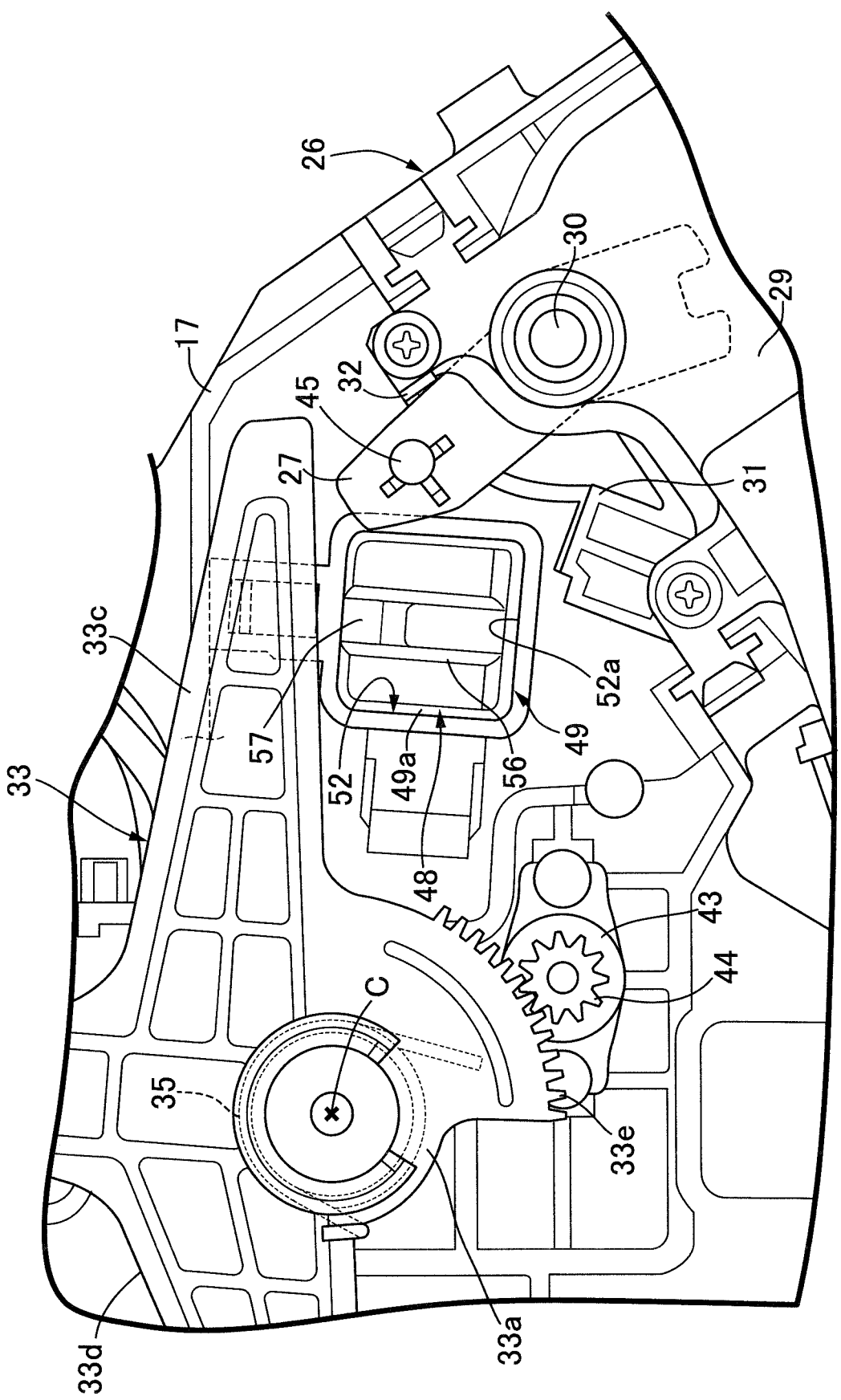
FIG. 10 is a side view, corresponding to FIG. 5, in a state in which the outer handle is in the full stroke position.

Furthermore, when the outer handle 13 is pivoted from the pop-up position to the full stroke position by the vehicle driver operating the operating portion 13a of the outer handle 13, as shown in FIG. 10 the handle lever 33 pivots while leaving behind the restricting member main portion 49a of the restricting member 49. In this arrangement, with regard to the restricting member 49 urged by the third resilient urging member 50, pivoting is restricted by the support arm portion 49b abutting against a rod-shaped fourth stopper 61 provided on an end part, on the housing hole main portion 52a side, of the extending hole portion 52b of the housing hole 52 so as to extend in the vehicle fore-and-aft direction.

When the electric actuator 26 is energized in a non-operated state due to suspension of energization after the drive lever 27 of the electric actuator 26 has pivoted from the initial non-operated position to the operated position so as to pivot the outer handle 13 from the housed position to the pop-up position, the electric motor of the electric actuator 26 rotates in the reverse direction from the time when the drive lever 27 starts moving from the initial non-operated position to the operated position. The drive lever 27 is thereby pivoted so as to return from the operated position to the initial non-operated position, the drive lever 27 abuts in sequence against the second inclined face 59, the curved face 60, and then the first inclined face 58 on one side of the opposite sides of the bulge part 56 of the restricting member main portion 49a, the restricting member main portion 49a is thereby pushed so as to be housed in the housing hole main portion 52a against the resilient force of the third resilient urging member 50, abutment of the inclined abutment face 57 against the second link arm portion 33c of the handle lever 33 is ended, and the handle lever 33 is returned to the initial position side by the first resilient urging member 35.

That is, the electric actuator 26 and the restriction device 48 are formed so as to release the restriction by the restriction device 48 accompanying a return operation of the electric actuator 26 as a result of energization of the electric actuator 26 after the outer handle 13 has attained the full stroke position.

The operation of this embodiment is now explained. Since the return of the handle lever 33 from the maximum operated position toward the initial position side is restricted by the restriction device 48 when the handle lever 33 is driven by the electric actuator 26 so as to pivot the outer handle 13 from the housed position toward the pop-up position side, even if the handle lever 33 is operated beyond the proper position by inertial force, it is possible, by restricting the maximum operated position of the handle lever 33, to prevent the handle lever 33 from rattling even when the handle lever 33 is urged toward the initial position side, and to prevent the handle lever 33, and consequently the outer handle 13, from rattling, thereby enabling the marketability to be enhanced.

Furthermore, since the handle lever 33 is pivotably supported on the support case 17, the restriction device 48 includes the restricting member 49 having the inclined abutment face 57 abutting against the second link arm portion 33c from the initial position side in response to the second link arm portion 33c of the handle lever 33 passing through when the outer handle 13 is operated from the housed position toward the pop-up position side, and the third resilient urging member 50 urging the restricting member 49 toward the side on which the inclined abutment face 57 is made to abut against the second link arm portion 33c, and the inclined abutment face 57 is formed in an inclined manner so as to abut against the second link arm portion 33c at the position that goes away from the initial position as the amount of operation, following the handle lever 33, of the restricting member 49 urged by the third resilient urging member 50 increases, even if the handle lever 33 is operated beyond the proper position by inertial force, it is possible to resiliently restrict the position of the handle lever 33 beyond the proper position while reliably making the inclined abutment face 57 abut against the second link arm portion 33c of the handle lever 33 following the movement of the handle lever 33.

An embodiment of the present invention is explained above, but the present invention is not limited to the above-mentioned embodiment and may be modified in a variety of ways as long as the modifications do not depart from the gist of the present invention.

What is claimed is:

1. An outer handle device for a vehicle door, comprising a support case that is mounted on an outer panel of a door,
   an outer handle that has an operating portion capable of being manually operated and is supported on the support case while being capable of being pivoted between a housed position in which the operating portion is housed on the support case side and a full stroke position due to a manual operation, a pop-up position being set between the housed position and the full stroke position,
   a handle lever that is operatively linked to the outer handle, is pivotably supported on the support case so as to be capable of operating, and is resiliently urged toward an initial position side when the outer handle is in the housed position, and
   an electric actuator that is mounted on the support case so as to be capable of switching between an energized and operated state in which the handle lever is driven from the initial position so that the outer handle is pivoted from the housed position to the pop-up position and a non-operated state due to suspension of energization when the outer handle attains the pop-up position,
   wherein the outer handle device further comprises a restriction device,
   said restriction device having:
   a restriction member having an inclined abutment face that abuts against the handle lever from the initial position side in response to the handle lever passing through when the outer handle is pivoted from the housed position toward the pop-up position side, and
   a resilient urging member that urges the restricting member toward a side on which the inclined abutment face is urged to abut against the handle lever, as the handle lever moves away from the initial position, and
   wherein the electric actuator and the restriction device are formed so as to release restriction by the restriction device accompanying a return operation due to energization of the electric actuator in response to a predetermined state being established after the outer handle attains the full stroke position.

* * * * *